(12) United States Patent
Stenton et al.

(10) Patent No.: US 8,025,573 B2
(45) Date of Patent: Sep. 27, 2011

(54) PHYSICAL REPRESENTATIONAL OBJECTS WITH DIGITAL MEMORY AND METHODS OF MANUFACTURE AND USE THEREOF

(75) Inventors: Stuart Phillip Stenton, Berkeley (GB); Guy de Warrenne Bruce Adams, Stroud (GB); Abigail Jane Sellen, Newbury (GB); Fraser John Dickin, Bristol (GB); Richard Anthony Lawrence, Chipping Sodbury (GB); James Thomas Edward McDonnell, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1199 days.

(21) Appl. No.: 11/192,366

(22) Filed: Jul. 29, 2005

(65) Prior Publication Data

US 2006/0030410 A1    Feb. 9, 2006

(30) Foreign Application Priority Data

Jul. 30, 2004    (GB) .................................. 0417142.7
Jul. 30, 2004    (GB) .................................. 0417145.0

(51) Int. Cl.
*A63F 9/24*    (2006.01)
(52) U.S. Cl. ................. 463/43; 463/11; 463/44
(58) Field of Classification Search .......... 463/1, 43–44, 463/47, 11
See application file for complete search history.

(56) References Cited

U.S. PATENT DOCUMENTS

| 5,190,285 | A | 3/1993 | Levy et al. |
| 5,853,327 | A * | 12/1998 | Gilboa ............................ 463/39 |
| 6,251,010 | B1 * | 6/2001 | Tajiri et al. ........................ 463/1 |
| 6,468,162 | B1 | 10/2002 | Nakamura |
| 6,773,325 | B1 * | 8/2004 | Mawle et al. ................. 446/175 |
| 2002/0052238 | A1 | 5/2002 | Muroi |
| 2002/0170973 | A1 | 11/2002 | Teraura |
| 2005/0162697 | A1 | 7/2005 | Kiwada |

FOREIGN PATENT DOCUMENTS

| EP | 1 367 551 | 12/2003 |
| EP | 1 435 598 | 7/2004 |
| GB | 2 334 456 | 8/1999 |
| GB | 2365796 | 2/2002 |
| GB | 2 381 211 | 4/2003 |
| GB | 2 397 272 | 7/2004 |
| JP | 10-334215 | 12/1998 |
| JP | 2002325970 | 11/2002 |
| JP | 2003-135846 | 5/2003 |
| WO | WO 98/24527 | 6/1998 |
| WO | WO 03/043709 | 5/2003 |

* cited by examiner

*Primary Examiner* — David L Lewis
*Assistant Examiner* — Robert Mosser

(57) ABSTRACT

A representational object contains a visual representation of a character and a memory tag comprising a digital memory adapted to be read from when inductively powered. The digital memory contains digital content relating to the character represented visually on the representational object. At least a part of the digital content relates to function of the character in a game carried out by a gaming application and comprises executable code for execution in connection with operation of the gaming application.

27 Claims, 17 Drawing Sheets

PHYSICAL REPRESENTATIONAL OBJECTS WITH DIGITAL MEMORY AND METHODS OF MANUFACTURE AND USE THEREOF

FIELD OF THE INVENTION

The invention relates to physical representational objects with digital memory and methods of manufacture and use thereof. In some aspects, it relates to documents and is of particular relevance to collectable cards and game cards, but has wider application. In some aspects, it invention relates to physical game pieces with digital memory. It also relates to game apparatus comprising such physical game pieces with suitable reader/writer apparatus for the physical memory, and methods of changing game state—for example, by interaction between game pieces or by movement of game pieces—during game play using such game pieces.

BACKGROUND TO THE INVENTION

Game cards and collectable cards are popular commercial items. In games such as Pokemon, the two genres combine. Other games include physical game pieces.

Current forms of gaming include computer gaming and conventional gaming. Computer gaming involves interaction between a player and a computer program through an appropriate user interface. Such gaming may involve multiple players over communication links. The computer gaming application or applications (which may be held locally to a player, held entirely at a server, or distributed between the two) implements game rules, provides the game environment, and holds game state. The virtual nature of such gaming can render it unsatisfying for some players as it engages only vision and sound. Conventional gaming (including conventional gaming and conventional board games) involves a collection of pieces and game rules associated with the game, and possibly a game board or other representation of an environment. Game state may include one or more of game piece location on a board, game resources physically held by a player, and game data held by a central arbiter (a non-playing referee). Game interaction can seem very natural to players, but in complex games much effort may have to be devoted to calculating and tracking game state.

"Wizards of the Coast" has published game cards in its NFL2000 title which contain digital data provided by barcode—the data relates to player skills. A special game coordinator is provided that manages fixed interactions between plays and players.

There is a continuing desire to enrich the experiences of gaming with game cards or game pieces and of collectable card collection. For example, it would be desirable to further develop the opportunities available for game play—it would be particularly desirable to create arrangements which allow natural user interaction but which not require complex assessments of game state by game players.

SUMMARY OF THE INVENTION

In a first aspect, the invention provides a representational object containing a visual representation of a character and a memory tag comprising a digital memory adapted to be read from when inductively powered, the digital memory containing digital content relating to the character represented visually on the representational object and at least a part of the digital content relates to function of the character in a game carried out by a gaming application and comprises executable code for execution in connection with operation of the gaming application.

DESCRIPTION OF DRAWINGS

Specific embodiments of the invention will now be described, by way of example, with reference to the accompanying drawings, of which.

DESCRIPTION OF SPECIFIC EMBODIMENTS

Before describing specific embodiments of this invention, there will first be described, with reference to FIGS. 1 to 6, a particularly suitable technology for use according to embodiments of the invention by which memory circuits can be attached to or incorporated within documents or other representational objects. The memory circuits described are a form of inductively powered circuit read and written by radio-frequency communication—as such they resemble the existing RFID tag—but it will be appreciated by the skilled person that alternative forms of memory circuit may also be employable for the purpose described. Such passive memory circuits, powered read and written inductively or by contact, will hereafter be termed "memory tags". As will be discussed below, in many applications, including certain embodiments of the present invention, limitation of interaction with a memory tag to contact or near-contact has practical advantages.

More specifically, there will be described, with reference to FIGS. 1 to 3, a technology by which memory tags can be attached to or incorporated within printed documents or other representational objects (although documents are exemplified here, the discussion is applicable to other two or three-dimensional objects). There will then be described, with reference to FIGS. 4 to 6, an exemplary method of printing documents whose published content for viewing is divided between a printed document and one or more memory tags attached to or incorporated within printed documents—the publishing of such documents will also be discussed.

Figure 1:
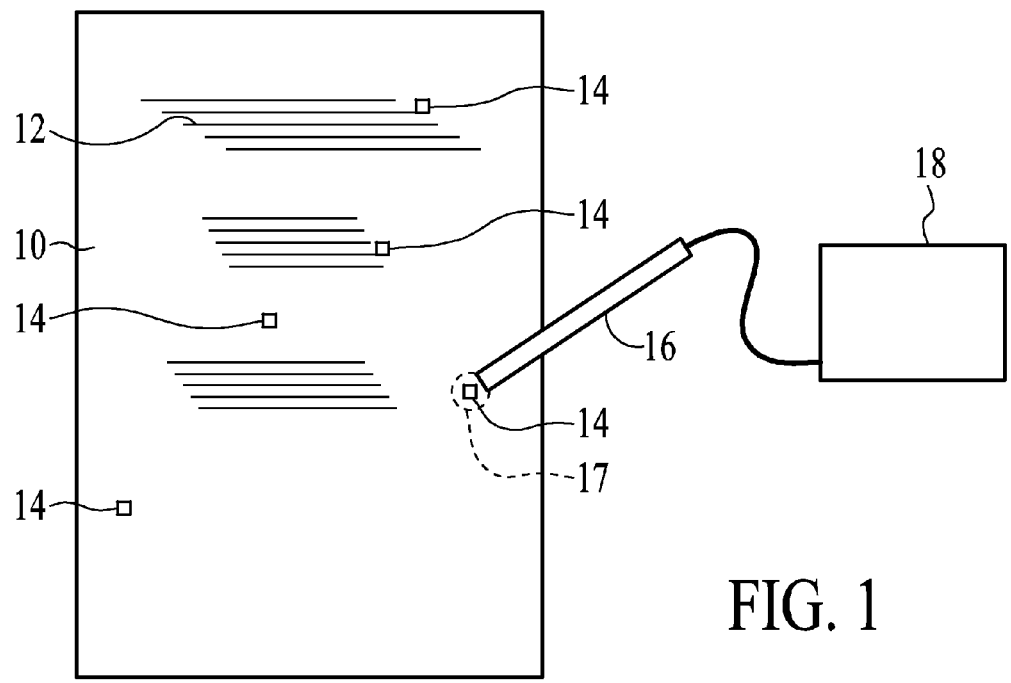
FIG. 1 illustrates a sheet of paper annotated with electronic data.

FIG. 1 illustrates an item, in this case a sheet of paper 10, bearing printing 12, which has been annotated with electronic data using a plurality of memory tags 14. The memory tags 14 have been secured to or embedded in the sheet of paper 10 in locations identified by the printing 12, in order to assist in locating them for the purposes of reading data from or writing data to the memory tags 14.

A hand held read/write device 16 is used to communicate with the memory tags 14 in wireless manner, as will be discussed further below. The read/write device 16 is also connected to a host computer, display, data rendering device or other apparatus 18 from which the data for writing to the memory tags 14 is received, and/or the data read from the memory tags 14 is passed. In other arrangements, the read/write device and the host computer may be the same device (for example, a cellular telephone with a display and an integrated reader).

Figure 2:
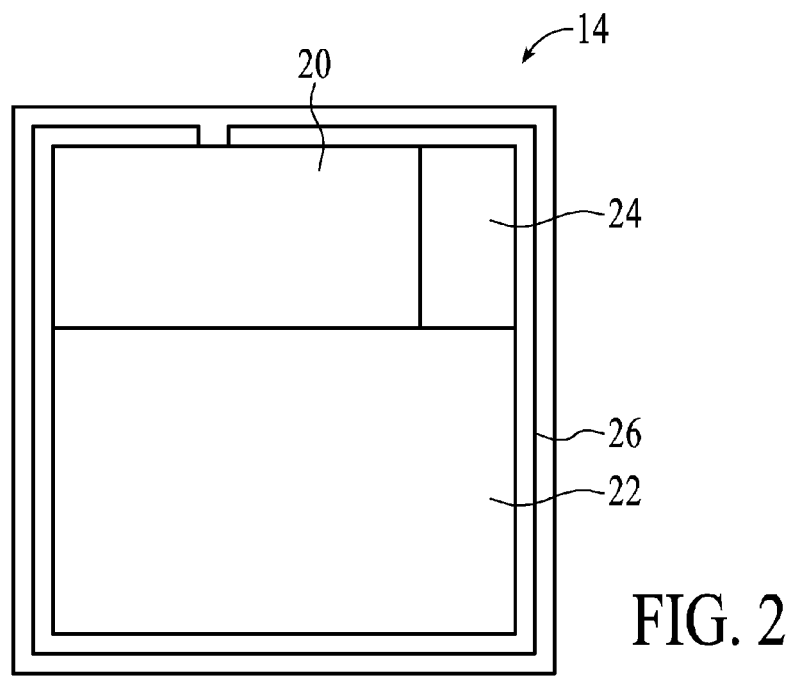
FIG. 2 illustrates an RFID memory tag suitable for use in specific embodiments of the invention.

Referring now to FIG. 2, a schematic of a memory tag 14 is shown. The memory tag 14 is an RFID memory tag provided on a chip, and comprises an RFID transponder circuit 20, a memory 22, a power supply capacitor 24 and an antenna coil 26 having only a few turns e.g. five, or as in this case a single turn. The RFID transponder circuit 20 operates at 2.45 GHz, is of an area of approximately 0.5 mm$^2$, and will be described further below. The memory 22 provides 1 Mbit of capacity of non-volatile memory and is of an area of approximately 1 mm$^2$, and uses FRAM (ferroelectric random access memory) or MRAM (magnetoresistive random access memory) or similar memory technology requiring low power. The memory tags 14 are of a substantially square shape in plan view with an external dimension D for their sides of around 1 mm.

Figure 3:
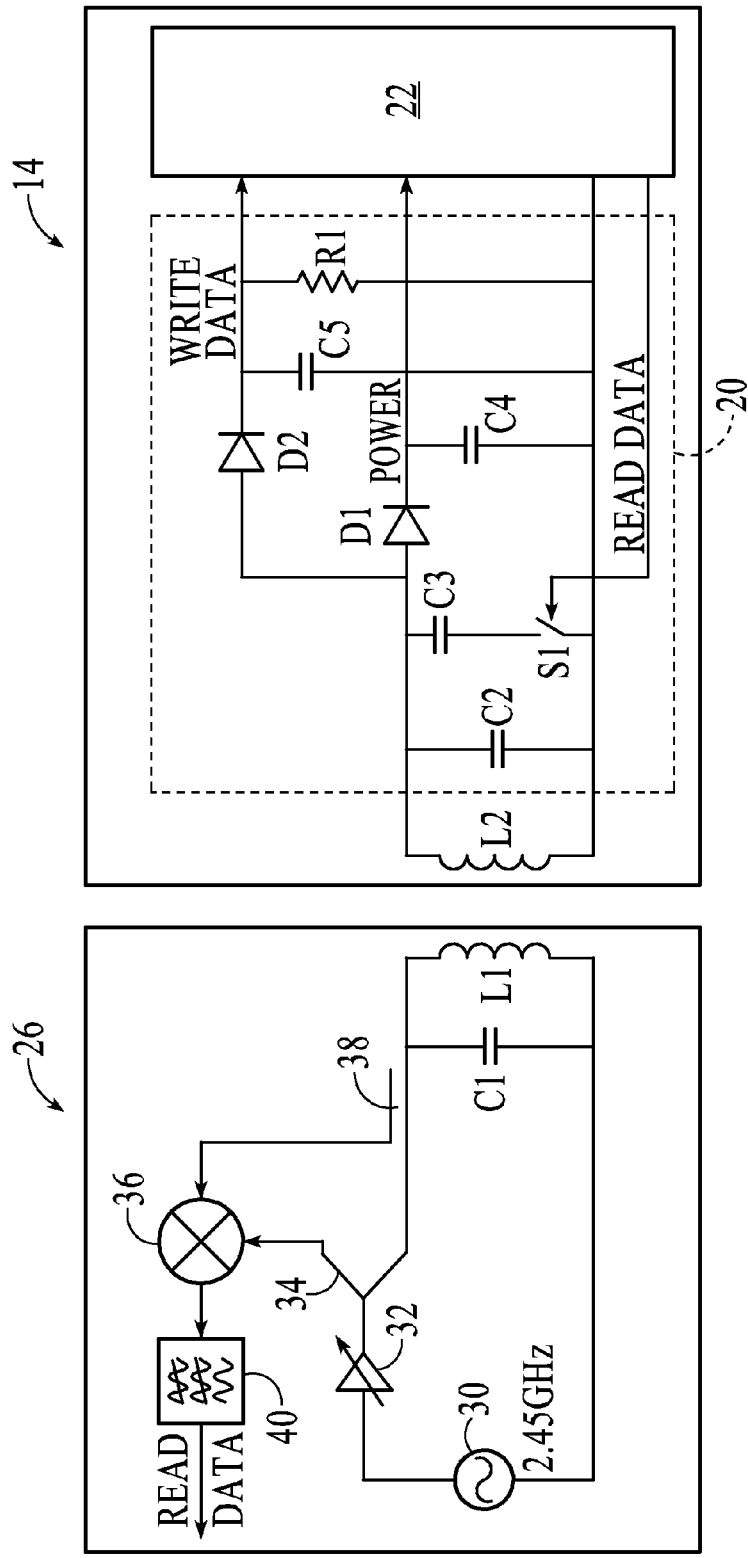
FIG. 3 illustrates the circuitry of the memory tag of FIG. 2 and of a read/write device for wireless communication with the memory tag.

Referring now to FIG. 3, the circuitry of a memory tag 14 and circuitry 28 of the read/write device 16 are illustrated schematically, using conventional component identifications (C-capacitor, L-inductance, R-resistor, D-diode and S-switch). The RFID transponder circuit 20 of the memory tag 14 comprises a capacitor C2 which, in combination with the antenna coil L2(26), forms a resonant circuit with component values being chosen to tune the combination to approximately 2.45 GHz for inductive coupling with the read/write device 16. The portion of transponder circuit 20 responsible for power supply is diode D1 and capacitor C4(24), with diode D1 rectifying the alternating current generated by the inductive coupling and the capacitor C4 acts as a power supply storage. The portion of the transponder circuit 20 responsible for receiving transmitted data from the read/write device 16 is diode D2, capacitor C5 and resistor R1 which form a simple envelope detector; the data thus received is stored in memory 22. The portion of the transponder circuit 20 responsible for the reading of data from the memory 22 is the tuned circuit L2/C2 in combination with S1 and C3, switching C3 in and out of the circuit using S1 changes the resonance of tuned circuit L2/C2 resulting in phase modulation of the reflected power from the memory tag 14 to the read/write device 16.

The circuit 28 of the read/write device 16 comprises a signal generator 30 which generates a signal at the chosen frequency of 2.45 GHz. This signal passes via an amplitude modulator 32, where it is amplitude modulated with data to be written to the memory tag 14, and a splitter 34, to an antenna L1 and capacitor C1 which form a tuned circuit. The component values of L1 and C1 being chosen to tune it to 2.45 GHz, as for the tuned circuit in the memory tag 14, in order to maximise inductive coupling between the two circuits, and thus transmission of power and data to the memory tag 14.

The splitter 34 takes a part (as much as 50% of the power) of the amplitude modulated signal, for use as a reference signal, and passes it to a multiplier 36. The signal received from the memory tag 14, via the tuned circuit L1/C1 and divided from the outgoing signal by a coupler 38, is also passed to the multiplier 36. Thus the transmitted amplitude modulated signal and received signal are multiplied and then pass through a low pass filter 40 to provide a signal comprising the phase modulation from the memory tag 14 and thus indicative of the data read from the memory tag 14. This signal is then passed to the host computer or other device 18 to which the read/write device 16 is connected, for subsequent data processing.

One amplitude modulation format which may be used to apply the data to be transmitted to the 2.45 GHz signal is Amplitude Shift Keying (ASK) which only requires the simple envelope detector D2/C5 described in the circuit 20. However, other amplitude modulation formats may also be employed. Further alternatives are Frequency Shift Keying (FSK) and Phase Shift Keying (PSK) that provide near constant envelope modulation, that is without any significant amplitude modulation, however these options have more complex demodulation requirements and thus demand more complex circuitry in the memory tag 14.

With the apparatus of memory tag 14 and read/write device 16 described above power transfer of around 25% can be achieved with a distance of around 1.8 mm between the antennae L1 and L2, of the read/write device 16 and memory tag 14 respectively. This is sufficient to transfer enough power to the memory tag 14 for it to operate.

The memory tags 14 have an external dimension D of around 1 mm, as described above, and therefore the read/write device 16 can communicate with them over a relatively short range, in this example of approximately 2D, (as illustrated on FIG. 1 by broken circle 17). However, the distance over which the read/write device 16 and memory tag 14 will communicate effectively will clearly vary with the exact details of their construction, and it may therefore be up to 10D. Communication over distances greater than this would limit the ability to use a plurality of memory tags 14 on a single sheet of paper 10, or other item, due to the distances which would be necessary between the memory tags 14 to ensure that the read/write device 16 does communicate with the desired memory tag 14 out of a number present. To ensure that communication is with the correct memory tag 14 in every circumstance a communication distance of 5D or less is preferable.

The memory tags 14 will preferably have a data rate of 10 Mbitss$^{-1}$, which is two orders of magnitude faster than is typical in prior art devices. Such a data rate would enable the read/write device 16 to be held over the memory tag for a very short period of time ("brush and go") for the data to be read or written as appropriate.

Although the memory tags 14 described above operate at 2.45 GHz it should be understood that memory tags operating at other frequencies may be used in embodiments of the invention. Factors affecting the choice of operating frequency for the memory tags are: a) government regulations concerning radio frequency transmissions; b) adequate bandwidth (consistent with government regulations); c) frequency high enough to render the physical size of components in the memory tag small enough to keep the area of silicon required low (and hence the cost to manufacture low); d) frequency low enough to provide adequate performance when using low-cost high-volume CMOS technology to manufacture the memory tag.

It should further be appreciated that memory tags of this functional type can be produced without using RFID technology. For example, optical technologies can be used to power, read and write to memory tags, as described in the applicant's earlier British Patent Application No. 0227152.6.

Figure 4:
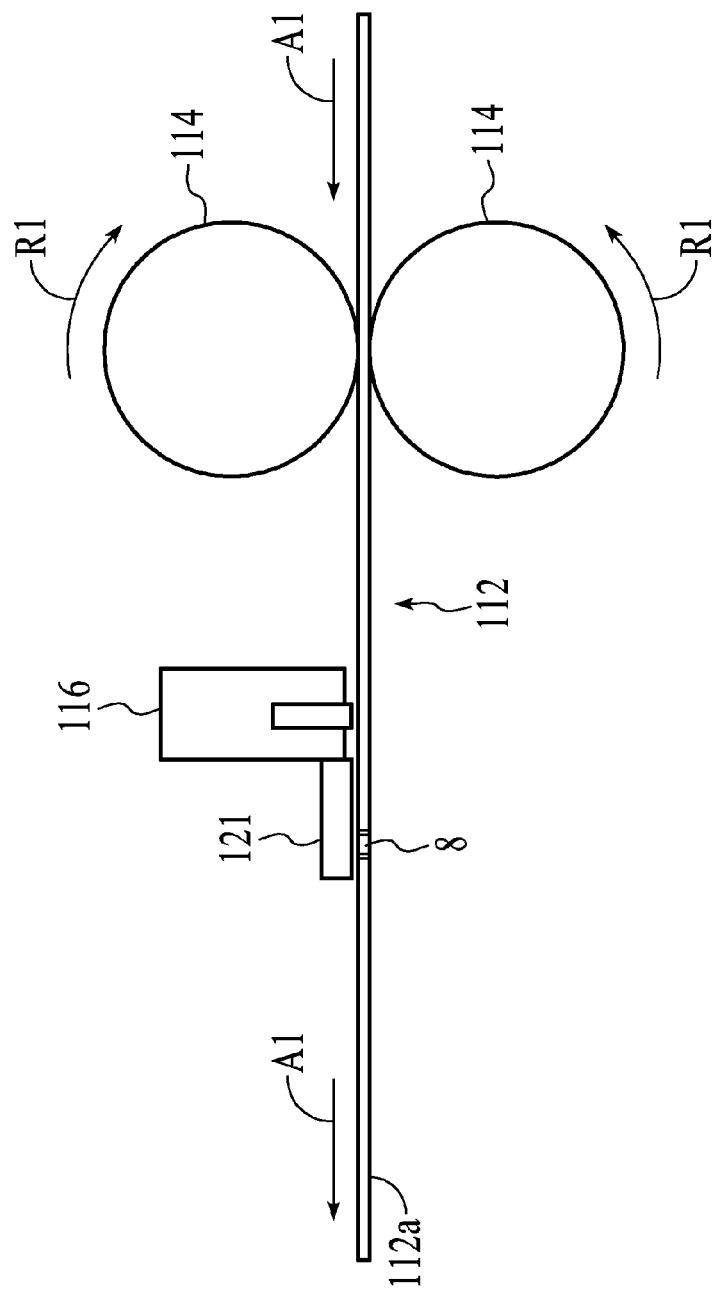
FIG. 4 is a schematic of the main elements of a printing device suitable for use to produce documents according to specific embodiments of the invention, shown from the side.
Figure 5:
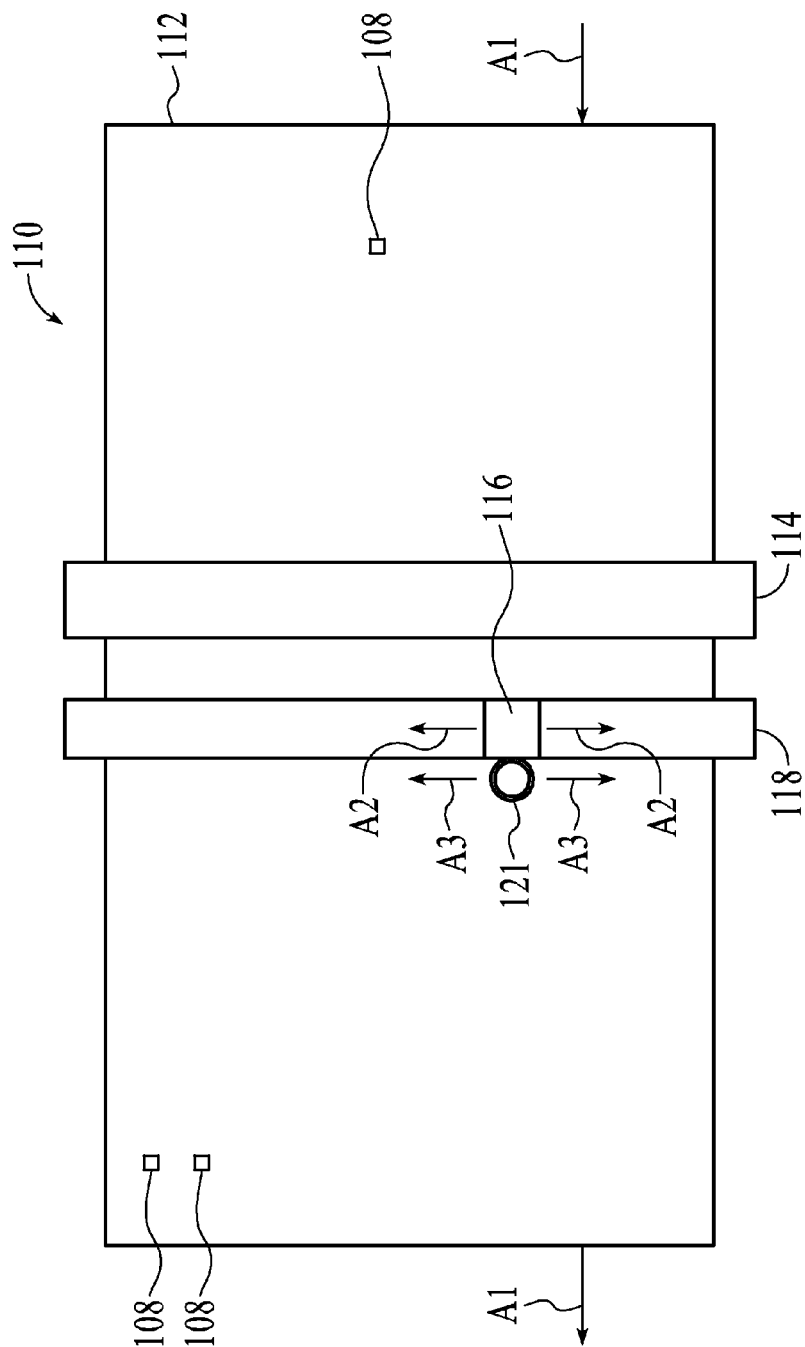
FIG. 5 is a schematic diagram of the apparatus of FIG. 4, shown from above.

Referring to FIGS. 4 and 5, apparatus 110 for printing onto a base medium and data writing to a memory tag in or on the base medium is illustrated. This embodiment is for use with a base medium in the form of sheet paper 112 (as will be described below, card stock is an equally appropriate alternative), to which memory tags 108 have been applied or within which memory tags 108 have been embedded (as shown in FIG. 4). The memory tags 108 are RFID memory tags for which the manner of writing data to the tags and reading data from the tags is well known (see above, but in addition for example the RFID Handbook, Klaus Finkenzeller, 1999, John Wiley & Sons). For simplicity only those parts of the apparatus 110 which need to be shown to describe the invention are illustrated and described. It will be understood that the apparatus 110 includes much known technology from the prior art of printers, and from the prior art of RFID memory tags, which is not described here.

The apparatus 110 includes paper feed rollers 114 which are driven to rotate as indicated by arrows R1 to feed the paper sheets 112 through the apparatus 110 along a first axis in the direction indicated by arrows A1.

The apparatus 110 further includes a print head 116, which in this example is of ink jet form, mounted on a print head carriage 118 which extends across the apparatus 110 substantially perpendicular to the axis A1. The print head 116 is moveable back and forth along the print head carriage 118, in known manner. Thus the print head 116 is moveable back and forth along a second axis indicated by arrows A2, substantially perpendicular to the axis A1, to enable the print head 116 to access most of the upper surface 112a of the paper sheet 112 as it moves through the apparatus 110, and thus to print anywhere on that accessible area of surface 112a as required.

The apparatus 110 also includes a memory tag read/write device 120 which operates in known manner to write data to and/or read data from memory tags as required using an inductive coil 121. The inductive coil 121 of the memory tag read/write device 120 is connected to the print head 116 for movement back and forth along the print head carriage 118 with the print head 116. Thus the inductive coil 121 is moveable back and forth along a third axis indicated by arrows A3, substantially perpendicular to the axis A1, and parallel to the axis A2, to enable the memory tag read/write device 120 to read data from and/or write data to memory tags 108 located anywhere on or in the accessible area of the paper sheet 112, as will be described further below (this third axis may not be necessary if memory tags are always located at a fixed point, or width, along the paper or card—as may well be the case for many of the embodiments described).

Figure 6:
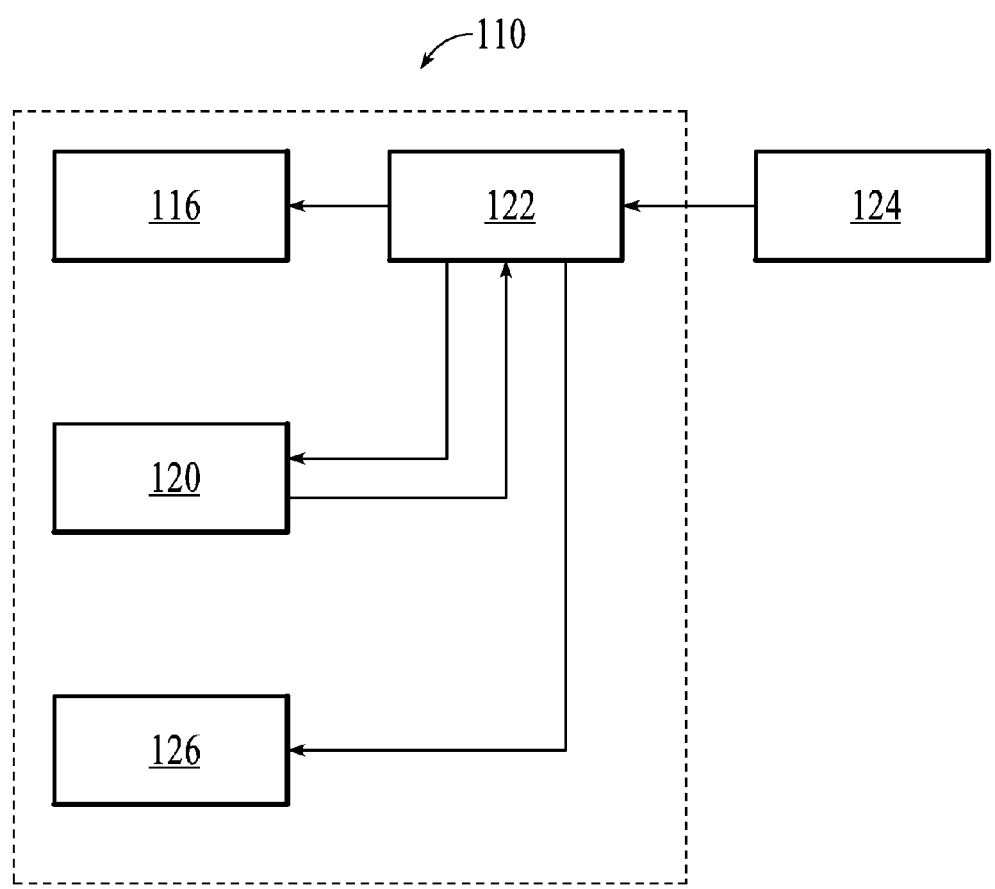
FIG. 6 is a block diagram of the control of the apparatus of FIGS. 4 and 5.

Referring now also to FIG. 6, the apparatus 110 also includes a main processor 122 and a mechanics controller 126, which controls all the mechanical operations of the apparatus 110, (i.e. the paper feed rollers 114, the movement of the print head 116 and inductive coil 121 along the print head carriage 118). The main processor 122 receives instruction signals from a host computer 124, including the details of:

what to print;
where to print it;
where the memory tag 108 is or tags 108 are in/on the paper sheet 112; and
what data to write to the memory tag(s) 108.

The main processor 122 sends command signals as required to:

the mechanics controller;
the print head 116; and
the memory tag read/write device 120,
to implement the instruction signals.

Thus the paper sheet 112 is fed through the apparatus 110 and has the required information printed on its upper surface 112a. At the same time the memory tags 108 on or within the paper sheet 112 have the necessary data written to them by the memory tag read/write device 120, with the movement of the memory tag read/write device 120 (and print head 116) being paused with the memory tag read/write device 120 over the or each memory tag 108 as necessary for the data writing to take place.

The manner of co-ordination of the printing and data writing processes will depend on a number of factors. If, for example, the memory tags 108 are only present adjacent the top and/or bottom of the paper sheet 112 then the data writing process can take place before and/or after the printing. This would avoid the necessity for the printing process to be interrupted, and would make the co-ordination simpler. Further, when implemented with an inkjet printer, which in general requires a pause, after printing has been completed before the paper sheet is ejected, to allow the ink to dry, the data writing process could conveniently take place during this pause for memory tags present adjacent the bottom of the paper sheet 112.

In embodiments of the invention, the memory tags 108 will typically be read by hand held readers. Thus in order to assist users in the future to locate the memory tags 108 on the paper sheet 112 the memory tags 108 may have icons printed over their locations which can be readily identified by users.

The memory tag read/write device 120 may, in addition to writing the data to the memory tags 108, also conduct a read operation to check that the data has written successfully before the paper sheet 112 is moved on following the data write operation. Alternatively, particularly if the apparatus 110 is operating at high speed, a separate data check device (not shown) may be included in the apparatus such that this operation takes place downstream of a memory tag write device which in this case need not also be capable of data reading.

The arrangement specifically shown illustrates a single print head. There may of course be multiple print heads, or a duplex unit, to allow double sided printing by any appropriate conventional manner.

It will be readily appreciated by the person skilled in the art that the modification to a conventional printing technology (in this case, the functional structure of the printing device is that customarily found in inkjet printing technology) can be employed to functional structures used in other printing technologies, such as laserjet and digital presses (such as HP Indigo presses). This last technology is particularly suitable for mass production of documents, for example book publication.

Specific embodiments of the invention using the memory tag technology of FIGS. 1 to 6 will now be described in more detail.

In aspects, the invention provides a representational object containing a visual representation of a character and a memory tag comprising a digital memory adapted to be read from when inductively powered, the digital memory containing digital content relating to the character represented visually on the representational object and at least a part of the digital content relates to function of the character in a game carried out by a gaming application and comprises executable code for execution in connection with operation of the gaming application. This may be a game card or a game piece. Further aspects of the invention are also set out in embodiments below.

"Character" here has a broad meaning. In a collectable, it will normally relate to an individual sportsperson, but could also relate, inter alia, to a sports team or to an artefact. In a game card or game piece, it will normally relate to a game character, but it could also relate, inter alia, to a set of characters, an artefact, a place, a spell, or any other game function or associated item.

While "represented visually" will here normally refer to a picture, it may also apply to a different form of image, text or even statistical data.

Figure 7A:
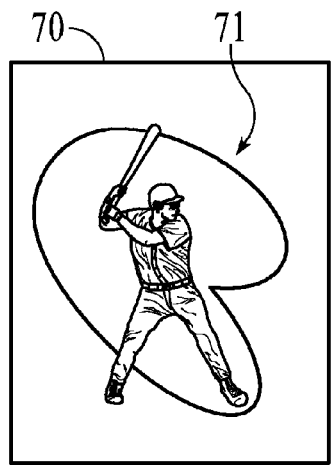
FIG. 7A and FIG. 7B illustrate a document according to a first embodiment of the invention.
Figure 7B:
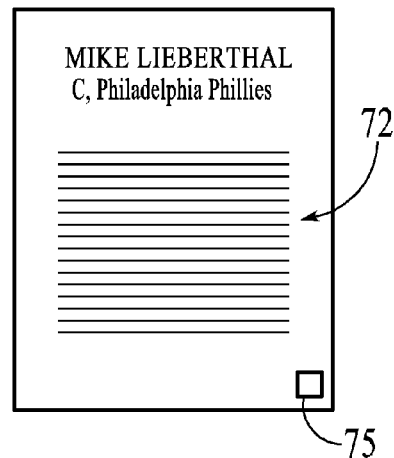
Figure 8:
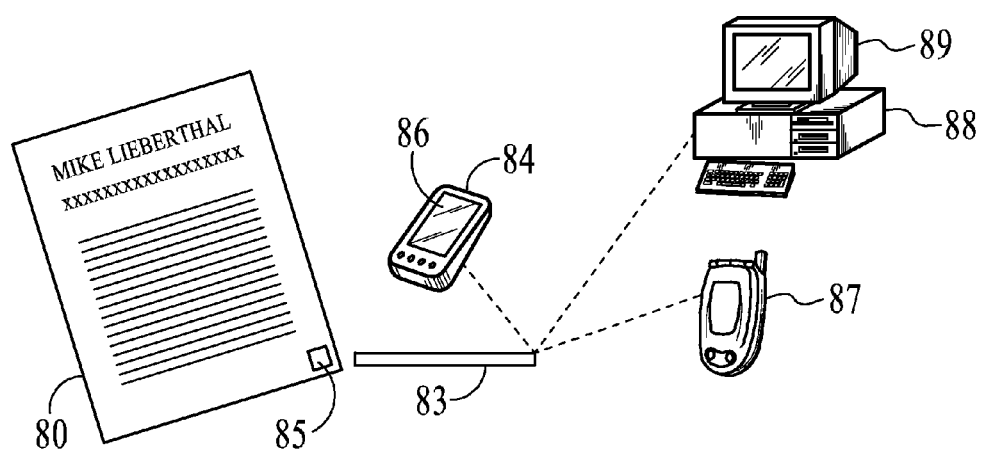
FIG. 8 illustrates digital data being read in the arrangement of FIG. 7, and shows alternative readers.

A first embodiment of the invention is shown in FIGS. 7A, 7B and 8. FIG. 7A shows the front face of a collectable card 70, displaying an image 71. The card may be constructed of any material suitable for making such cards—most typically a cardboard card stock. FIG. 7B shows the rear face of the card. This contains further information 72, here primarily text, but also a memory tag 75 inserted in or attached to the card as shown in FIG. 1. The memory tag 75 may be itself visible to the user, or may be indicated by a printed sign on the card.

The memory tag 75 contains digital information relevant to the information printed on the collectable card 70: this digital information may be one or more of, for example, audio, video, image, or executable code. If, as here, the collectable card 70 relates to a sportsperson, appropriate audio may be an interview with the sportsperson or commentary upon a performance, appropriate video may similarly be highlights of one or more performances, appropriate image may be a higher definition image of the sportsperson than is printed on the card, and appropriate executable code may comprise a game, puzzle or quiz relating to the sportsperson.

FIG. 8 shows the example of a stylus reader 83 (of the general type shown in FIG. 1) wirelessly connected (for example, by Bluetooth or other similar short range wireless networking technology) to a PDA 84. The stylus reader 83 is in sufficiently close proximity to memory tag 85 of collectable card 80 to read data from the memory tag as described with reference to FIGS. 1 to 3. In this example, the digital data held in the memory tag comprises a video sequence, and this is being displayed on the display 86 of the PDA 84. Alternative display arrangements are shown: the stylus reader 83 may instead interact with or be an accessory to personal computer 88, with display 89. Another attractive option is for the stylus reader to interact with (or even be replaced by) cellular telephone 87. A cellular telephone 87 with an integral reader would be able to itself be used for a "brush and go" interaction with the memory tag 85, and if used for picture messaging, for example, will not only contain a display but may contain one of relatively good colour and definition.

It can be appreciated that this embodiment may be used not only for collectable cards, but also for game cards. A card may describe a game character for use in a particular computer game. Digital content may be of the kind described above for collectable cards (for example, a video clip of the game character in combat action—so bringing the character for life) but may also or instead contain the attributes of the character for use in the computer game, so that on uploading the digital content from the memory tag, the computer game will be able to add that character to the characters that can already be employed or selected within the game. Cards according to this first embodiment may then effectively be used for computer game expansion.

In this first embodiment of the invention, it is not necessary for the data in the memory tag to be rewritten. The memory tag may therefore be adapted to be read-only, with the digital data within it left unchanged. The general purpose memory tag of FIGS. 1 to 3 can however be both read from and written to by a reader. FIG. 9 illustrates a second embodiment of the invention which uses this functionality.

Figure 9A:
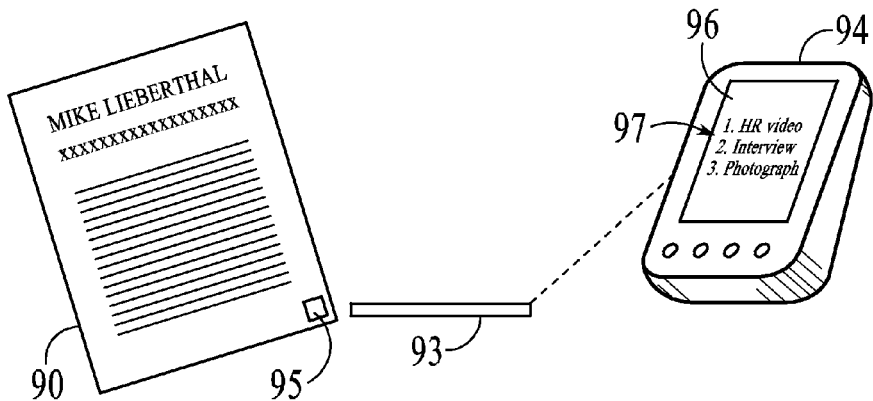
FIG. 9A illustrates a document according to a second embodiment of the invention, with data being read therefrom.

Physically, collectable card 90 of FIG. 9A resembles collectable card 70 of FIGS. 7A and 7B, but in this case memory tag 95 can be written to as well as read from. This allows the possibility of providing the collectable card 70 without digital content and of allowing the digital content to be downloaded, or of allowing digital content to be swapped between cards. FIG. 9A shows an example of a content loading operation. Display 96 of PDA 94 contains a list of content suitable for inclusion in memory tag 95. Stylus 93 (which is here adapted to provide digitiser input to the PDA 94, and also to act as a memory tag reader) can be used to select content from the list 97 for downloading to the memory tag 95 in a write operation as described above. The list 97 could here be a list of relevant content held on PDA 94 or on a network to which PDA 94 has access.

Figure 9B:
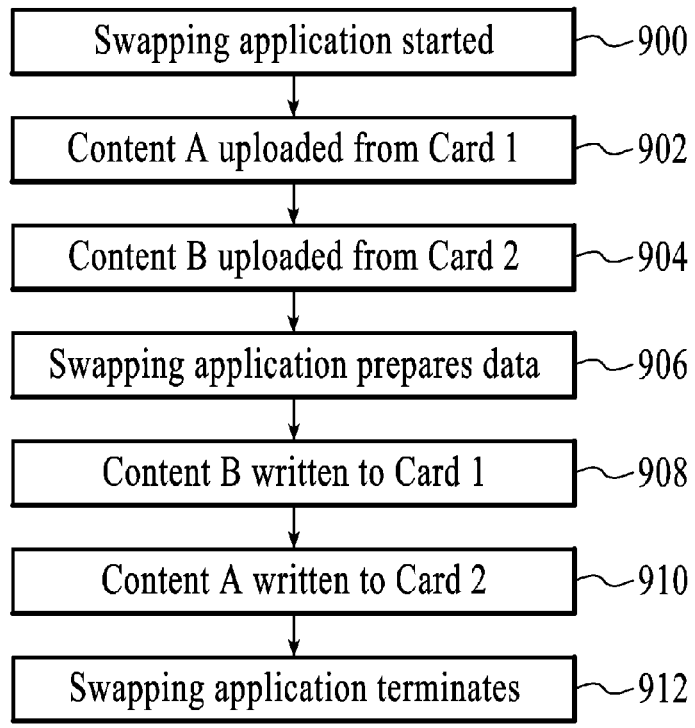
FIG. 9B illustrates swapping of digital data between documents in accordance with the second embodiment of the invention.

It will be appreciated that if the available digital content is controlled, then a number of distribution models become available. One particularly attractive distribution model is for digital content not to be available for general download, but only for "swapping" between collectable cards. This requires some kind of control—for example such that the application on or associated with the readers for rendering the content not to be such as to allow the digital content to be copied except in the context of a swap—the skilled person being able to choose appropriate options from the existing digital rights management art. FIG. 9B shows the steps that might be followed in such a copying operation. Owners of card 1 and card 2 have decided to swap data (for example, both may have cards displaying a famous footballer—one card has a video clip of a celebrated goal, the other has a series of quizzes and puzzles, and the users wish to swap this content). In step 900, a swapping application is started on the reader and requested to upload content in the next two steps. In step 902, content A is uploaded from card 1 to a reader by reading the memory tag on card 1. Content A is held in a manner such that it cannot be copied out of the swapping application. In step 904, content B is uploaded from card 2 to the reader by reading the memory tag on card 2. The reader swapping application now has two sets of content, and can be instructed in step 906 to write the data to the memory tags on the appropriate cards. In step 908, content B is written to card 1 by writing to the memory tag on card 1. Similarly, in step 910, content A is written to card 2 by writing to the memory tag on card 2. The digital content is preferably not retained in any usable form by the swapping application (or in the reader generally) when it terminates (step 912).

Figure 10:
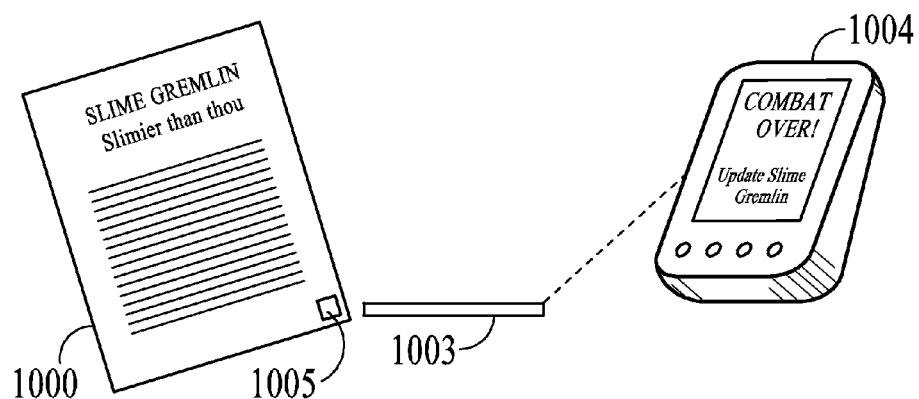
FIG. 10 illustrates documents according to a third embodiment of the invention and their interaction through a reader.

A third embodiment of the invention is illustrated schematically in FIG. 10. The card 1000 in this embodiment is a game card as discussed with reference to FIGS. 7A and 7B, and contains in its memory tag 1005 attribute data for the character depicted on the card. However, as in the FIG. 9 case, the memory tag 1005 can be both read and written to by stylus reader 1003. This allows for attribute data stored in the card to be not only fixed (attributes which define a character) but also changeable and hence updatable (current character attributes during a game, or attributes that change as a result of a gaming interaction). The game card 1000 can thus be read at the beginning of, or at an appropriate stage during, the running of a gaming application on a computing entity (here PDA 1004) associated with the reader, and subsequently updated at the end of, or at an appropriate stage during, the gaming application. The gaming application could request "character in" or "character out", and could then go into a waiting state until the appropriate memory tag was brushed by the reader 1003. Such a gaming application may work with a single game card, but a more attractive option may be competition between two game cards—this could run under control of the gaming application on the PDA 1004 in a manner similar to the swapping of data shown in FIG. 9B. The application could therefore request that the attributes be uploaded from each card in turn, and calculate new attributes on the basis of a combat or other interaction simulated by the gaming application on the basis of the attributes provided. The new attributes could then be downloaded to each game card.

Related developments in the development of game pieces are described in the applicant's co-pending British Patent Application of even date entitled "Physical Game Pieces With Digital Memory And Methods Of Use Therefor".

Figure 11A:
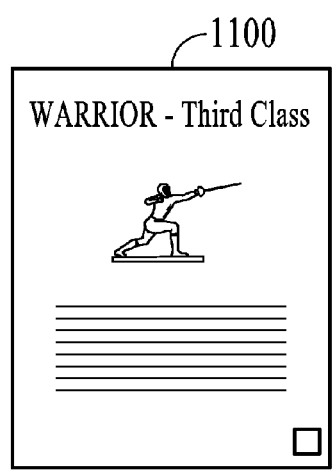
FIGS. 11A, 11B and 11C illustrate different steps in the reprinting of a document according to a fourth embodiment of the invention.
Figure 11B:
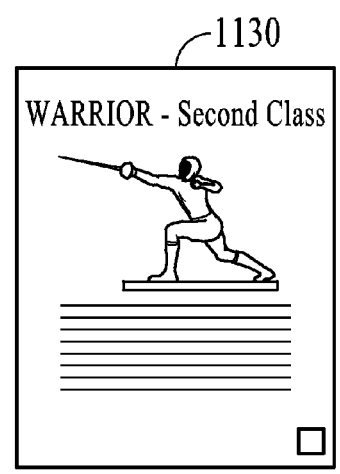
Figure 11C:
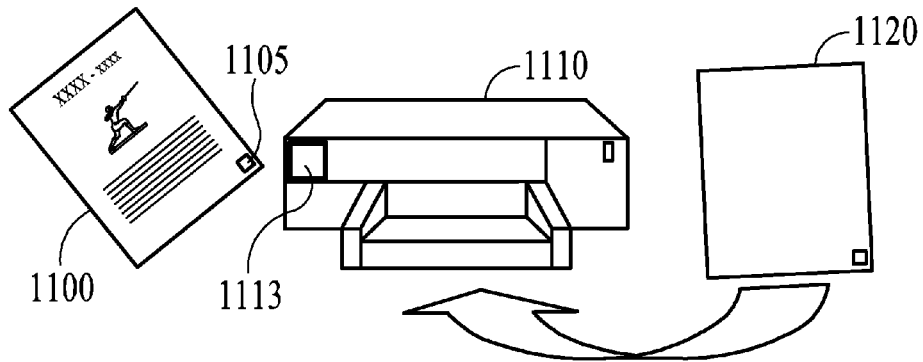

A further development is shown in the fourth embodiment, discussed with relevance to FIGS. 11A, 11B, 11C and 12. The second and third embodiments discuss the possibility of changing the digital data in the memory tag. Digital data in the memory tag may include a representation of any image and text data printed on the card itself. Changing the data in the memory tag—which may occur for a collectable card (a newer image of the subject of the card) or a game card (the character represented by the card may have reached a higher level and be entitled to a more impressive representation)—could involve changing the associated data for display on the card. It would therefore be desirable to reprint the card to show the new image. If blank card stock with memory tags embedded or otherwise attached (or later attachable) are available, this can be done. As shown in FIG. 11A, an existing card (for the sake of example, a game card) 1100 has the information in its memory tag 1105 changed in such a manner to allow upgrading to a new status after a gaming interaction with stylus reader 1103 and PDA 1106. As shown in FIG. 11B, the game card 1100 is then brought to a system with a card printer 1110, provided with a blank card 1120 of the same dimensions (and memory tag location) as game card 1100. In this arrangement, the card printer 1110 is itself provided with a reader 1113 for memory tags—however, the reader could be associated with a host computer (a user's PC) or any other computing device able to print to the printer. The game card memory tag 1105 is brought sufficiently close to the printer reader 1113 to allow the content to be read—the printer 1110 will be running an application that looks for appropriate image data from a memory spot (in arrangements where the reader is associated with a PC, this is even more straightforward—information is uploaded from the memory spot and then sent to the printer through conventional printer drivers) and prints it (this may either require conversion to bitmap at the printer, or the data may be provided in appropriate form by the game application for which the game card is used) with the new images and text. The memory tag data needs to be transmitted to the newly printed game card (shown as game card 1130 in FIG. 11C—this can simply be done by whichever reader read the original game card 1100, as the data merely needs to be buffered by the reader (or associated computing device) as it need not be changed.

Figure 12:
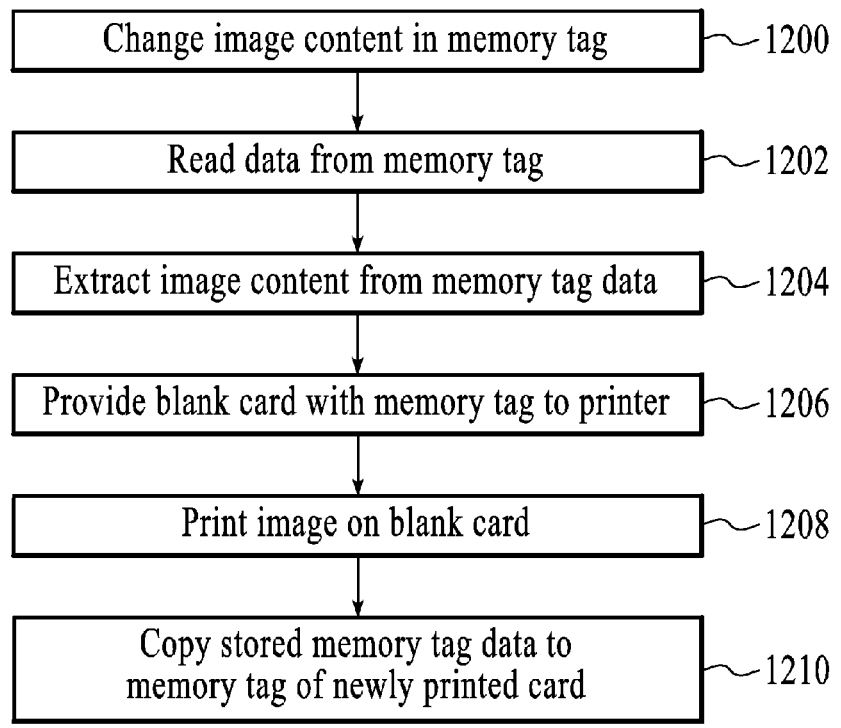
FIG. 12 is a flow diagram indicating a process of reprinting of a document as depicted in FIGS. 11A to 11C.

The steps involved in regenerating a card with a new image are shown in FIG. 12. Firstly the image content of the memory tag is changed (1200); after this the data (all the data) is read from the memory tag (1202) by a reader directly or indirectly associated with an appropriate printer; the image, text, or any other data needed for reprinting the card (1204) is extracted from this data; the printer is provided (1206) with blank card stock and the image content is printed to the card (1208); and the stored memory tag data is copied (1210) to the new card. The new card is thus a reprinted version of the updated card—it has the same stored data (there could be minor variations—such as the setting of a flag to show that the printed image matched the stored image) but new image data.

One benefit, or interesting feature, of this approach is that the new form of the game card or collectable card may be either known or unknown to the card owner (depending on the approach taken in the application used to generate it). The new image may be one that has been known to the user and it has been a specific objective for him/her to achieve it, or it may be a complete surprise. Likewise, the printed information may be known, or it may be entirely new to the user. In the latter case, the reprinting of the card may be itself a step in a game (if new information necessary for the user to know to progress in the game is only revealed by the reprinting).

It may be appreciated that the approach shown above and in FIGS. 11A, 11B, 11C and 12 may also be used when no new image is needed, but when the original collectable card or game card has been damaged—a pristine card may be obtained by reprinting in this fashion.

Figure 13:
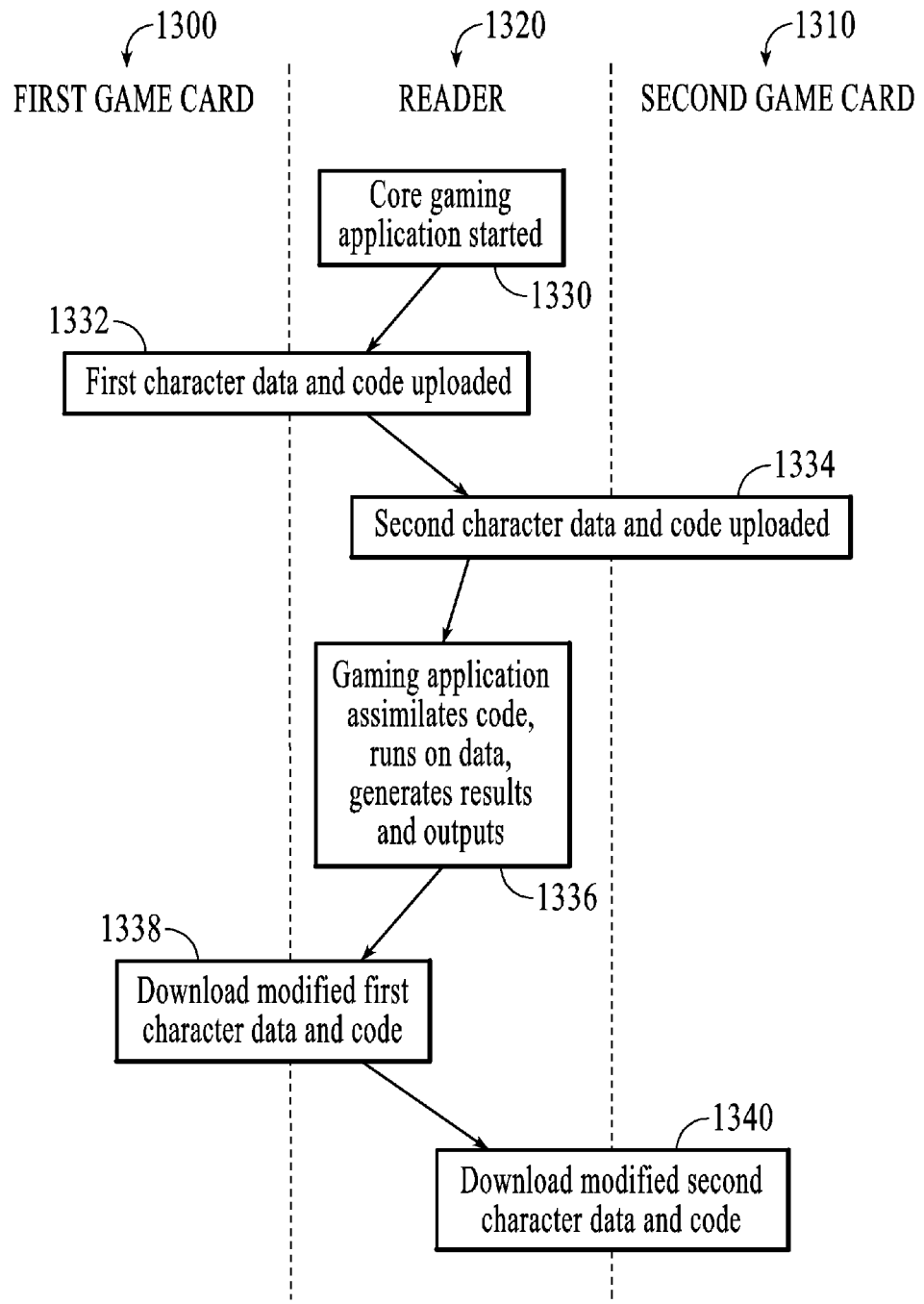
FIG. 13 illustrates documents according to a fifth embodiment of the invention and their interaction through a reader.

A fifth embodiment of the invention is shown in FIG. 13. This arrangement is similar to the third embodiment shown in FIG. 10—in fact, it would not be distinguishable to the user, but as shown in FIG. 13, the interaction between the game cards 1300 and 1320 is of quite a different quality. Instead of the reader 1310 being the only source of application software, and the memory tags containing only data relating to their associated game characters, the memory tags now contain executable code. The true nature of the application acting on the character data of the game cards is therefore not defined until the code from each game card is defined. This allows more varied and unpredictable game play, and may allow games to be effectively upgraded by introduction of new game cards, rather than merely have their character sets expanded. The steps shown here are broadly similar to those shown in FIG. 9B: in step 1330, the core gaming application is started on the reader 1310; in step 1332, the gaming application requires download of character data and code (in a different arrangement, this could be simply code) from the first game card 1300; in step 1334, the gaming application similarly requires data and code from the second game card 1320; in step 1336, the gaming application assimilates the code from the first and second game cards and runs a combat or other interaction on the basis of the first and second game card data, generating a result on the display associated with the reader 1310 and producing output data to be downloaded to the first and second game cards; and in steps 1338 and 1340, the gaming application prompts downloads to the first and second game card in turn with updated data, updated code, or both. A further possibility is for updated image data to be generated—in which case the reader provide an appropriate prompt to the game card owner, and the fourth embodiment of the invention may be employed.

Embodiments of the invention using the aforesaid memory tag technology to provide digital memories within game pieces will now be described. In appropriate embodiments of the present invention, a game player can combine the advantages of use of physical objects rather than virtual objects, of using computational resources to hold state information and process data, and of having a natural and intuitive user interface in game interactions.

Figure 14:
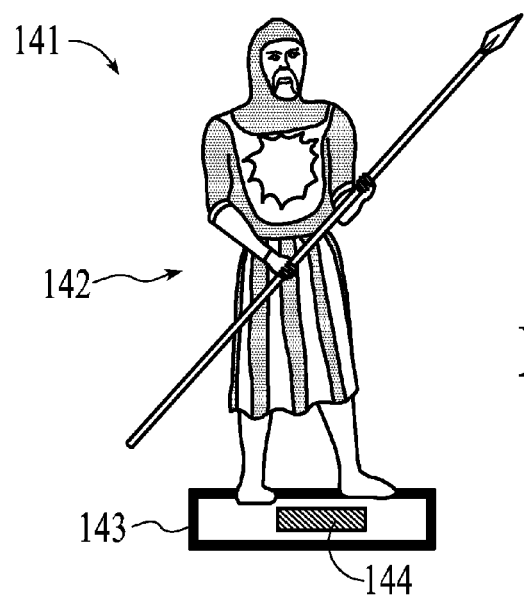
FIG. 14 shows a game piece according to a sixth embodiment of the invention.

A game piece in accordance with a sixth embodiment of the invention is shown in FIG. 14. The game piece 141 is a figurine visually being of a type used in conventional wargaming, with a representation 142 of a warrior. Such figurines are conventionally made of metal or plastics material—in this arrangement, advantageously of plastics material. In the base 143 of the game piece there is included a memory tag 144. This memory tag may be adhered to the base 143, but is advantageously encapsulated within the base 143, as shown here, to guard the memory tag 144 from physical harm.

Such a memory tag 144 may be read by an appropriate reader when the reader is brought into sufficiently close proximity, as discussed above. The memory tag may similarly be written to at close proximity. A game piece 141 of this type may be used in a form of conventional wargame enhanced by digital content. More specifically, the digital memory of the memory tag 144 may be used to hold all the game state information relating to the game character that the game piece represents. "Character" is used here in a general sense—noting that a figurine of this type may represent a single figure, a military unit, or even an artefact (such as a protective building)—of any game element that has its own state. In conventional wargaming, a player has to keep track of this state if it is changeable—resulting in confusing and complex game play—or needs to refer to an appropriate key if it is not changeable (in which case, the game play is limited to existence or non-existence of characters—which may prove unsatisfying as an oversimplification of any simulation of reality). In an arrangement in accordance with the sixth embodiment of the invention, characters reveal their game state directly on being read.

Figure 15:
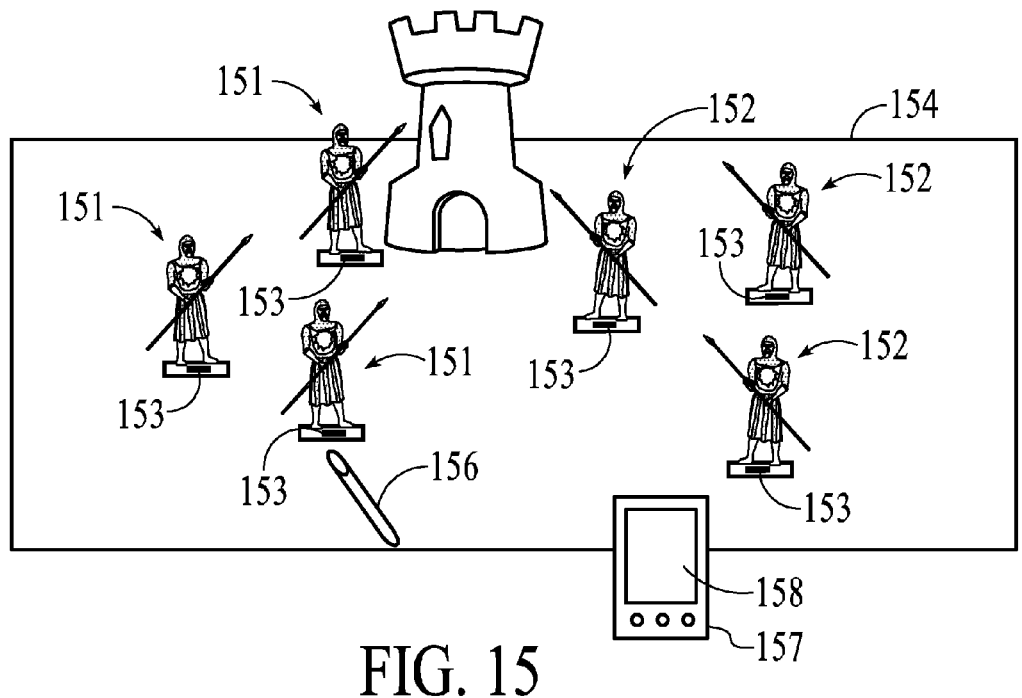
FIG. 15 shows a game in progress according to a sixth embodiment of the invention.

FIG. 15 shows an arrangement of elements needed to play a war game of the type suggested above with pieces of the type shown in FIG. 14. Two types of pieces, first game pieces 151 and second game pieces 152, are shown. These game pieces are here of similar types, forming two opposed "armies". Each game piece maintains its own state in its memory tag 153—this state may include, for example, an indication of damage taken to this point or sustainable before the death of the piece, an indication of piece combat effectiveness (which may be affected on how many combats the piece has been engaged in) or an indication of piece morale (likelihood that a piece will abandon the combat and flee). The pieces here are shown on a game board 154. A game board may itself contain reading/writing apparatus to read game state information from the pieces (such arrangements will be described further with reference to the seventh embodiment), but here does not. A reader/writer apparatus 155 here comprises a stylus reader/writer 156 in communication with a computing device 157—specifically in this instance a PDA with a display 158, the stylus and display further comprising the user interface to the PDA and to game software held in a memory of the PDA and running on a processor of the PDA. In such an arrangement, the stylus reader/writer 156 may either be generally in communication with the PDA 157 (through a wired connection, or a wire replacement technology such as Bluetooth) or may itself be a computing entity adapted to receive information and store it, and then to transmit it, in response to appropriate control.

Figure 16:
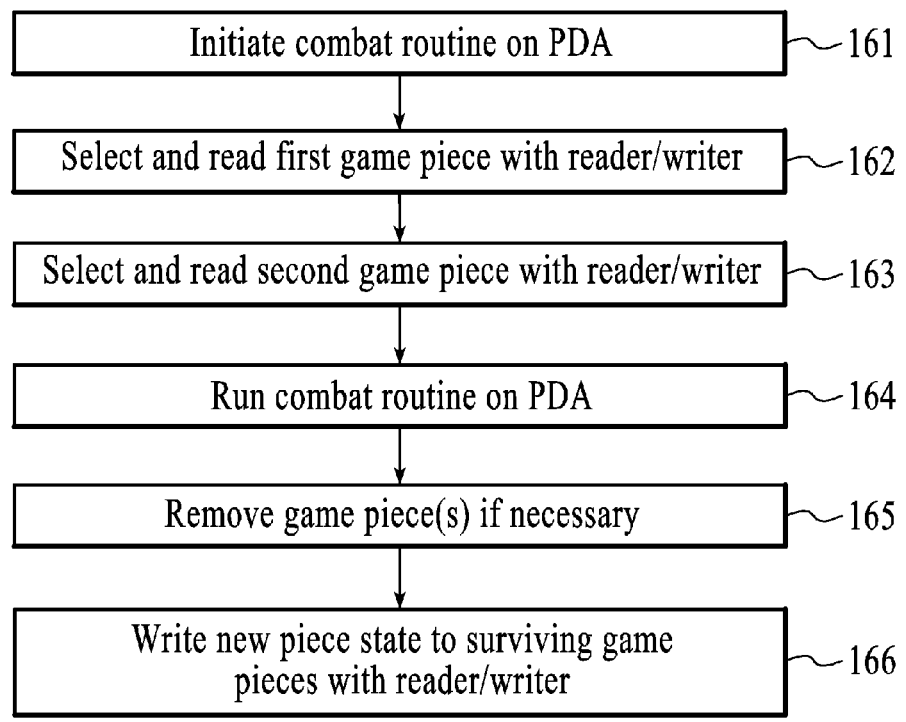
FIG. 16 shows a flow diagram for change in game state by interaction between game pieces according to a sixth embodiment of the invention.

An interaction between game pieces according to game rules will now be described with reference to FIG. 16. Firstly, a combat between game pieces is initiated on the PDA by starting (step 161) the combat routine for the game software. The PDA user interface prompts the player to select a first piece for combat—the player selects a first piece (step 162) by reading its memory tag with the reader/writer, the information from the reader/writer passing to a memory of the PDA. Combat may allow multiple game pieces to participate from either sides (or may even allow more than two sides to participate), in which case the user interface would request additional game pieces for the first side until the player indicated that no more pieces were to be involved. In this example, however, we will just consider a combat between two game pieces. The next step (step 163) is therefore the selection of a second piece by reading of its memory tag with the reader/writer, the information from the reader/writer again passing to a memory of the PDA. On confirmation that no further game pieces are to be involved in combat, the combat routine on the PDA can continue to the combat stage. Combat rules are stored in this example in the PDA as part of the game software package for the PDA, and all state information relating to each of the game pieces involved (such as attacking strength, defensive strength, frequency of attack, current strength, morale etc.) is now known to the PDA. Combat will typically include some random or (in practice) pseudorandom element. This may of course simply be generated by a routine on the PDA, but it may be more satisfactory for the user to provide the seed (for example, by a simulated roll of a die—an image of a die may be provided on the PDA, and a stylus movement on the PDA may provide the seed for a pseudorandom number generation while also providing an animation of a die moving and "bouncing" off the screen boundary in the direction of the stylus movement). The combat routine is now able to run (step 164) as all the information that it requires is present. The combat routine will provide results to the player(s) on the PDA screen. This may indicate that certain game pieces have been destroyed. In this case, such game pieces should be removed from the game board (step 165), and possibly also written to by the reader/writer to indicate that they are now inactive. The PDA screen should prompt which action needs to be taken with respect to which piece, with the player confirming when the action has been taken. Surviving pieces will remain on the board, but they need to be written to (step 166) by the reader/writer to update the piece game state information to reflect any changes as a result of the combat.

An advantage of this arrangement is that games can run without any need for maintaining a complex overall game state. It may be possible to run a game without any central measure of game state (enhancing the realism of combat) or with only minimal scoring information held by the PDA. Such computationally augmented wargaming allows for a satisfyingly natural player experience with complex game play without the need for players themselves to maintain, or navigate through, complex state information. Rather than running on a single PDA, each player could have their own computing apparatus, and these could then communicate (advantageously over a short range wireless connection, using, for example, Bluetooth).

Figure 17:
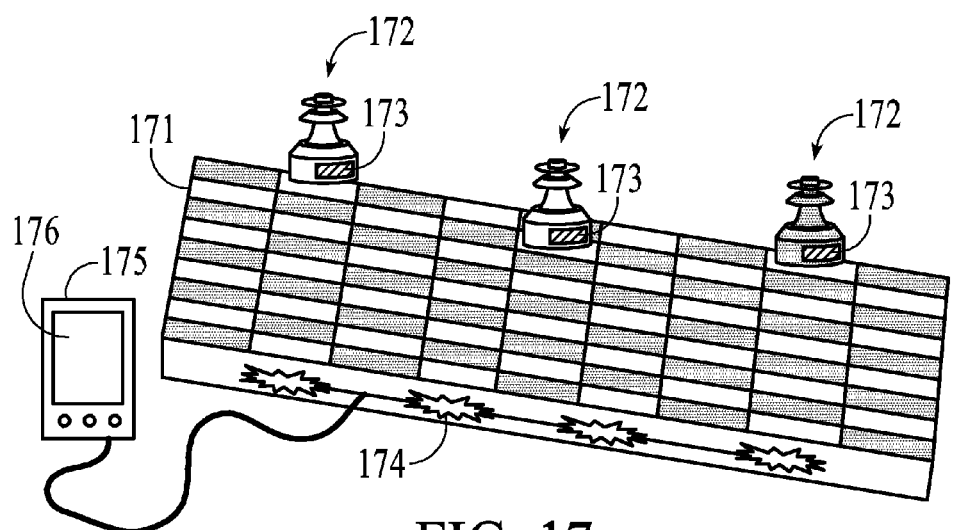
FIG. 17 shows a game board and game pieces according to a seventh embodiment of the invention.

A seventh embodiment of the invention will now be described with reference to FIG. 17. A game board 171 (in this case a chess board) has game pieces 172 disposed upon it—the game pieces 172 each have a memory tag 173 located within their base. The board 171 comprises a memory tag reader/writer comprising one or more antennae adapted to pick up signals from any relevant location on the board—in this case, disposed so as to determine which square any particular game piece is located upon. In the simplest arrangement possible, there would be one antenna 174 for each game square, but with sufficient reader/writer range and triangulation according to signal strength, it is possible to reduce the number of antennae employed (though this may make it necessary to address multiple signal problems). The reader/writer board 171 is in communication (here, wired communication) with a computing apparatus 175 (here, again a PDA) with a user display.

If the memory tag simply contains a piece identifier, then certain useful applications are available. A move may be sensed by removal of a piece from its existing position, and placement of that piece on another position (possibly accompanied by the removal of a captured piece). The PDA can then be equipped with a control program which determines whether that move is a legal one, or may calculate a best move from the existing position (and, for example, send messages to the user that he has moved the "wrong" piece, or moved the "right" piece to the "wrong" square). Such applications however could also be realised with different technology—such as conventional RFID—as they do not require any state information in the game pieces to be changed. Entirely different forms of game play become available when state information of game pieces can be changed.

An example of such a different game type is modified chess with probabilistic capture based on piece activity. Probabilistic capture is here taken to mean that unlike in conventional chess, in which a capturing piece is certain to capture the piece whose square it moves to occupy (if the move is legitimate), the capture may or may not occur with some probability (alternatives being, according to game option, that if capture does not occur, either no move takes place, or the "capturing" piece is itself removed from the board with the "captured" piece remaining on. The probability of capture may be determined in part by the value of the piece (either as in conventional chess or with some other weighting) but may be influenced by other factors. Such another factor may be piece "energy"—this may be dissipated by making moves or captures, so the probability of successful capture may be lowered if the piece has been very active (and similarly, an active piece may be more prone to capture by another). Such an arrangement allows for very different game play. Again, state information is now held by the piece, and updated after each move has taken place.

Figure 18:
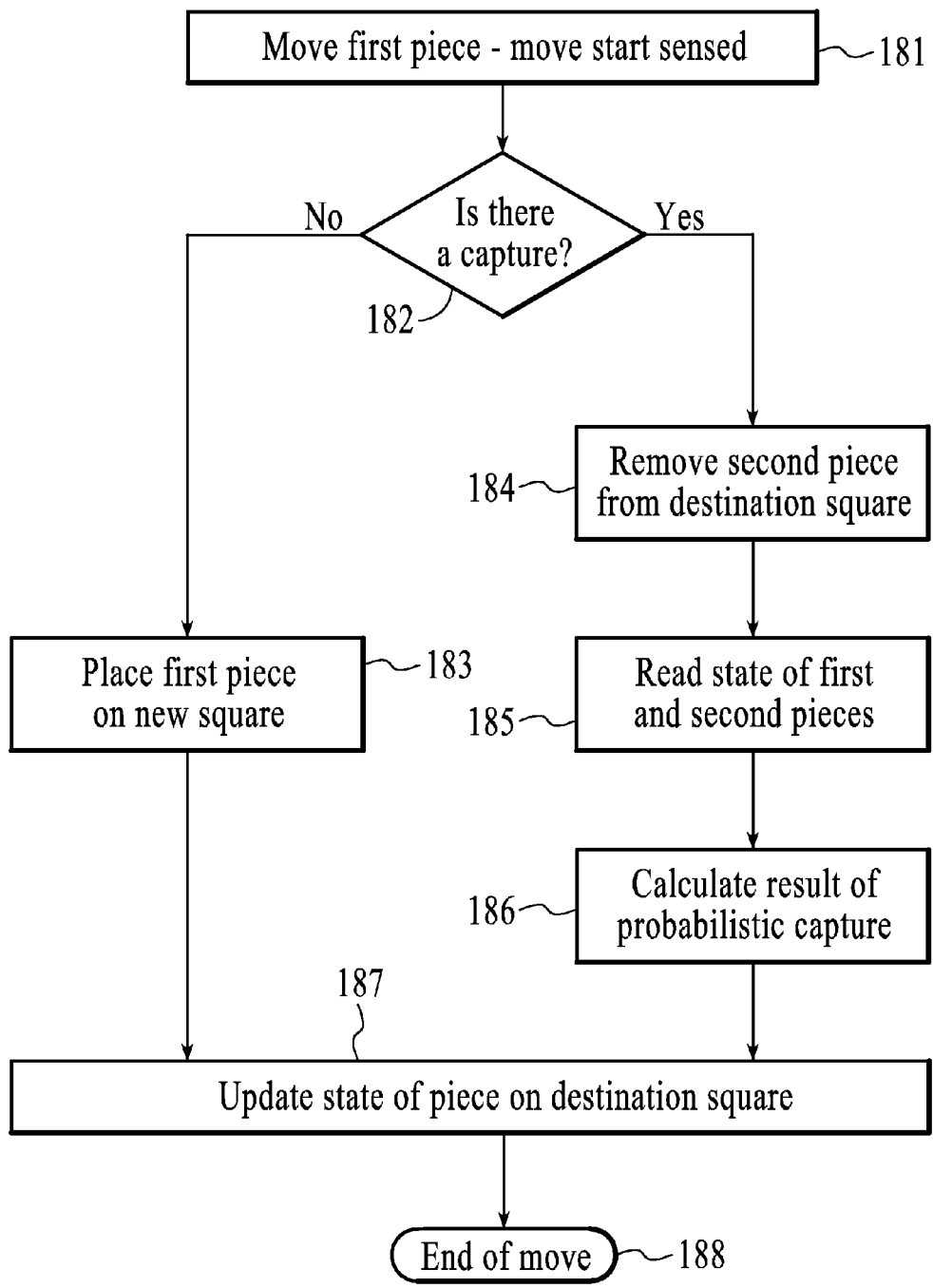
FIG. 18 shows a flow diagram for change in game state by movement of a game piece according to a seventh embodiment of the invention.

Steps for carrying out a move in such a probabilistic chess game are set out in FIG. 18. A move commences with movement of a piece (step 181), at which point the reader/writer is able to sense removal of a piece (as it can no longer be read) and hence of the start of a move. The next consideration is whether the move is, or is not, a capture (step 182). If it is not, the piece is moved on to its destination square (step 183). If the move is a capture, the piece on the destination square is also removed from the board (step 184). The PDA has the full game state available to it throughout the game (as all game pieces can be read when on the board) so if piece state is stored on the PDA, a probabilistic capture can be calculated directly—however, if the PDA does not hold piece state, it is necessary to read both pieces at this point (step 185). The probabilistic capture may then be carried out (step 186) in the manner described above—with capture probability being determined according to base piece values modified by features determined by game progress, such as piece activity—a pseudorandom number needs to be generated to establish the result in accordance with the calculated probabilities (this could, for example, be seeded by the player(s) as discussed for the sixth embodiment). The surviving piece is placed on the destination square. Whether or not there has been capture, the piece on the destination square then has its state updated by the reader/writer board (step 187) and the move ends (step 188).

In arrangements as described for this seventh embodiment, full game state is available to the PDA as the reader/writer in the board is able to read any piece on the board. In this respect, the seventh embodiment has some similarities to fully virtual computer games (though lacks the immediacy and visual appeal of playing with physical pieces). One area of difference is that there is the possibility for removing a physical piece from a game and placing it in another game—as the game piece is passive, it maintains its game state between games. This leaves the alternative possibilities of initialising all pieces before a game (to allow each game to be of the same type) or for the stored values to be used in the new game. This allows a variant of chess to be constructed in which a player uses his or her own trained chess pieces.

Piece training is known in computer games (such as Pokemon) but not in the context of physical pieces. Clearly in either of the sixth or seventh embodiments it is possible for piece state to be preserved after a game, and potentially for pieces to be used in new games. Such an arrangement may prove more suitable for conventional wargaming than for chess. A physical army may be used for an entire campaign, comprising of a number of discrete battles, and pieces may develop in skills over the campaign. Figurines for destroyed pieces may be given new character values during a campaign (reinforcements may be provided at regular times during a campaign period, for example). Complex game play is thus possible with a simple 3-dimensional arrangement which is both simple and natural for player interaction.

Figure 19:
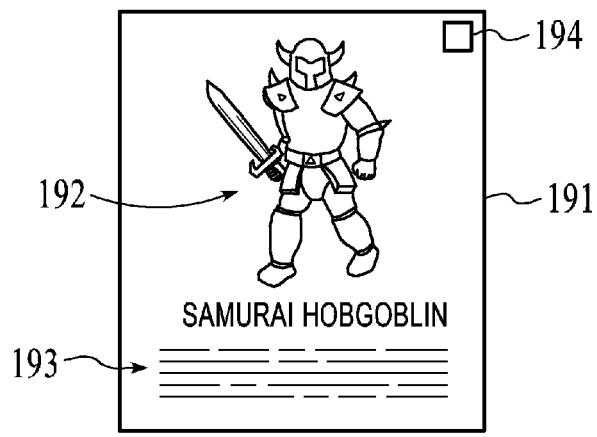
FIG. 19 shows a game piece, in the form of a game card, according to a eighth embodiment of the invention.

Such new forms of game play are possible with game cards as game pieces as well as with three-dimensional figurines, as is shown for an eighth embodiment of the invention. FIG. 19 shows an exemplary game card of this type—game card 191 contains a representation 192 of a character, relevant biographical and ability information for the game character in text panel 193, and also contains a memory tag 194 containing state information.

Game cards as shown in FIG. 19 can of course be used in exactly the same manner as figurines of the type described with reference to the sixth embodiment of the invention. Game play will typically be of a somewhat different type, however—there will generally be no need for a game board, and card-based games (such as, for example, Magic), typically employ characters of different types and capabilities and more complex sequenced game play.

Figure 20:
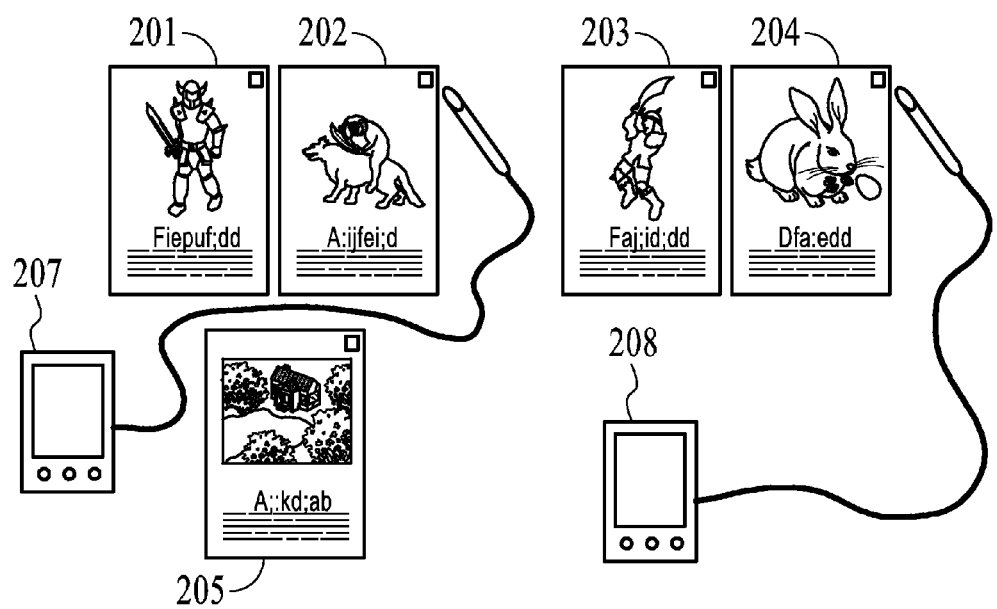
FIG. 20 shows game cards according to the eighth embodiment of the invention involved in a gaming interaction between two players
Figure 21:
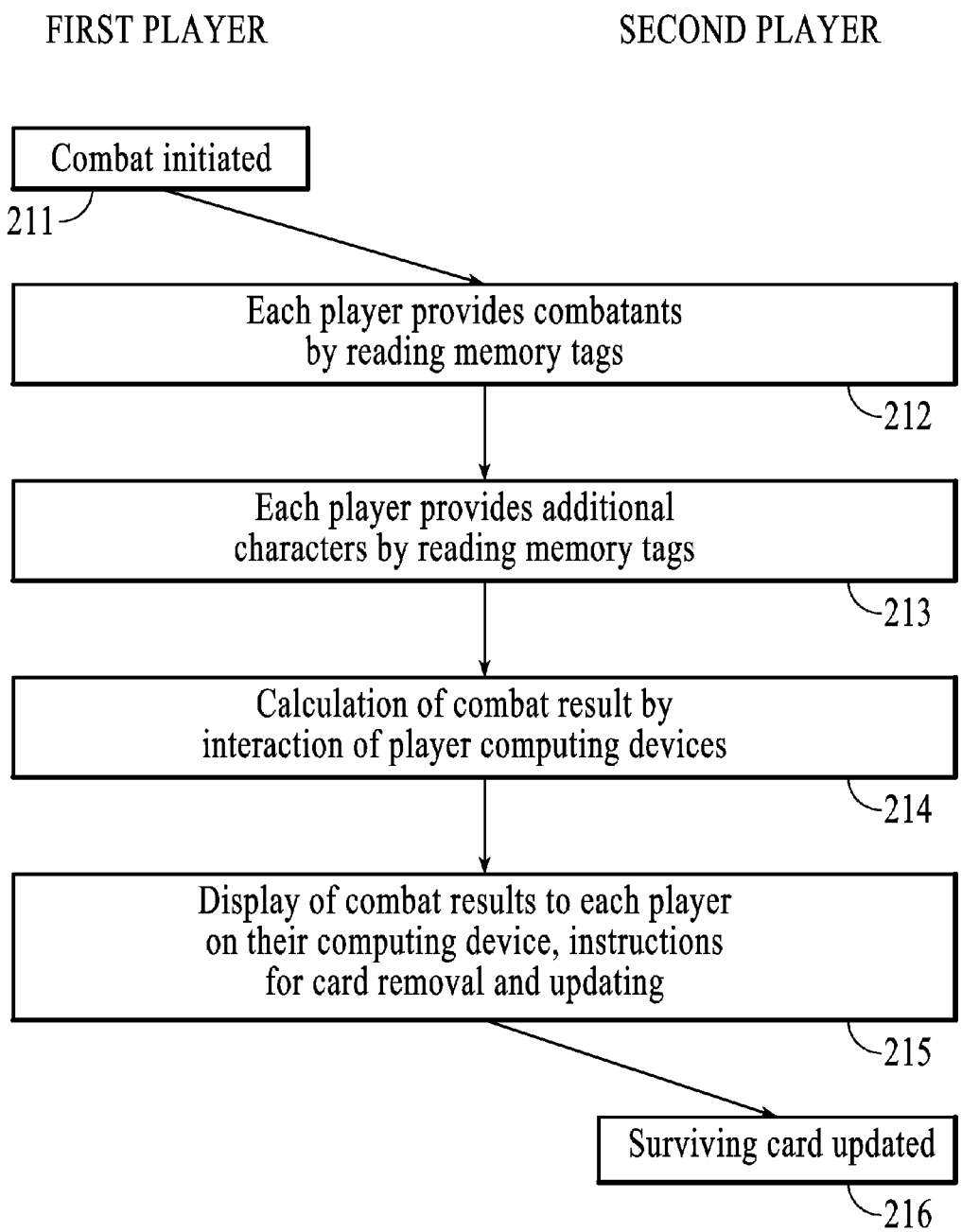
FIG. 21 shows a flow diagram for the gaming interaction of FIG. 20.

An example of sequenced game play with cards of the type shown in FIG. 19 is illustrated in FIGS. 20 and 21. FIG. 20 illustrates cards involved in a combat, the steps of which are illustrated in FIG. 21. A first player has two cards 201, 202 representing combat characters and a third card 205 representing a different type of game character—in this case a magic spell, which affects combat between characters by modifying combat rules. A second player also has two cards 203, 204 representing combat characters, but has no card with any other type of game character. In this arrangement, each player has their own reader/writer stylus and PDA combination 207, 208.

Steps in a combat involving this set of cards are set out in FIG. 21. A combat is initiated by the first player (step 211). Each player is then prompted to provide their combatants (step 212)—this is done by reading the memory tag of each combatant with the reader/writer stylus. Each player is then prompted (step 213) to provide any other characters to be used in the combat—the second player has no such characters, but the first player can declare card 205—the spell—and does so. The spell may, for example, change combat conditions (by locating all the participants in the water) which may make certain properties or aspects of the state of the combatants more or less relevant or significant. With this arrangement, depending on the game play, it may be possible to play certain types of card without making them physically visible to an opponent at all, or until a certain stage of the combat. For example, in this case the combatants may be known before the combat commences, but any modifying characters not known until the combatants are committed. At this point, the PDAs between them know all necessary game state, and the combat result can be calculated (step 214). This can obviously be carried out on either PDA as the two are in communication, though for demonstrable fairness it may be desirable to split the processing between the two PDAs. Players may seed pseudorandom numbers in manners described above if necessary for game play. The result of the combat will be an agreed change in state for all game characters involved—possibly accompanied by a score (again agreed between the PDAs). This combat result will be displayed (step 215) to each player. The players will then need to remove any game cards which have been spent or destroyed, and any player with surviving cards (let us assume that only card 204 of the second player survives in this case) will need to update game card state (step 216) as a result of the combat for surviving game cards that may be used for future combat.

In the arrangements described above, the computing apparatus that processes the combat or other interaction has associated with it stored game rules and game control software. It is possible to shift some or all of this game control to the game cards themselves, and this itself may lead to new forms of game and game interaction. An example is shown with respect to FIGS. 22 and 23

Figure 22:
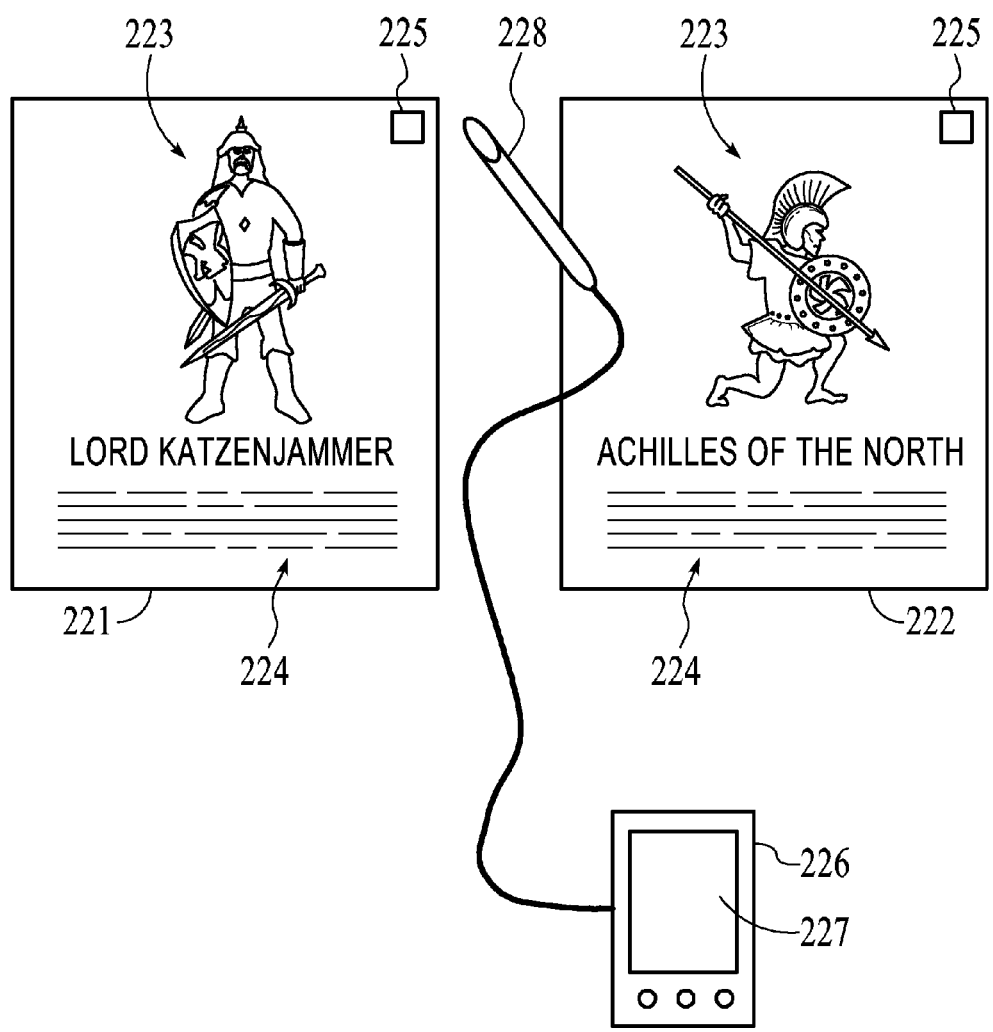
FIG. 22 shows game cards according to a modified version of the eighth embodiment of the invention involved in an interaction between the two cards.

FIG. 22 shows two cards 221, 222 visually similar to those depicted in FIGS. 19 and 20. Each card has a depiction of a character 223, a name and some descriptive text 224, and a memory tag 225. Also shown is a computing apparatus, in this case a PDA 226 with a display 227 (though as for the FIG. 20 arrangement, each player could again have their own computing apparatus) which connects to a stylus reader/writer 228 for communication with the memory tags.

Where this arrangement differs from that shown above is that not only game state variables relating to the character depicted are stored in the memory tags 225, but also interaction rules relating either to that character or more generally to the game involving that character. This requires a very limited application at the PDA 226—it is necessary only to recognise that the game card is of a particular general type, then to download not only game state data relating to the game card character but also interaction rules relating to that game card and, advantageously, code to run the interaction. This allows the game to evolve naturally without requiring software at the computing device to be upgraded—new kinds of game card with new kinds of capability may be introduced, with interaction with earlier cards still being possible.

Figure 23:
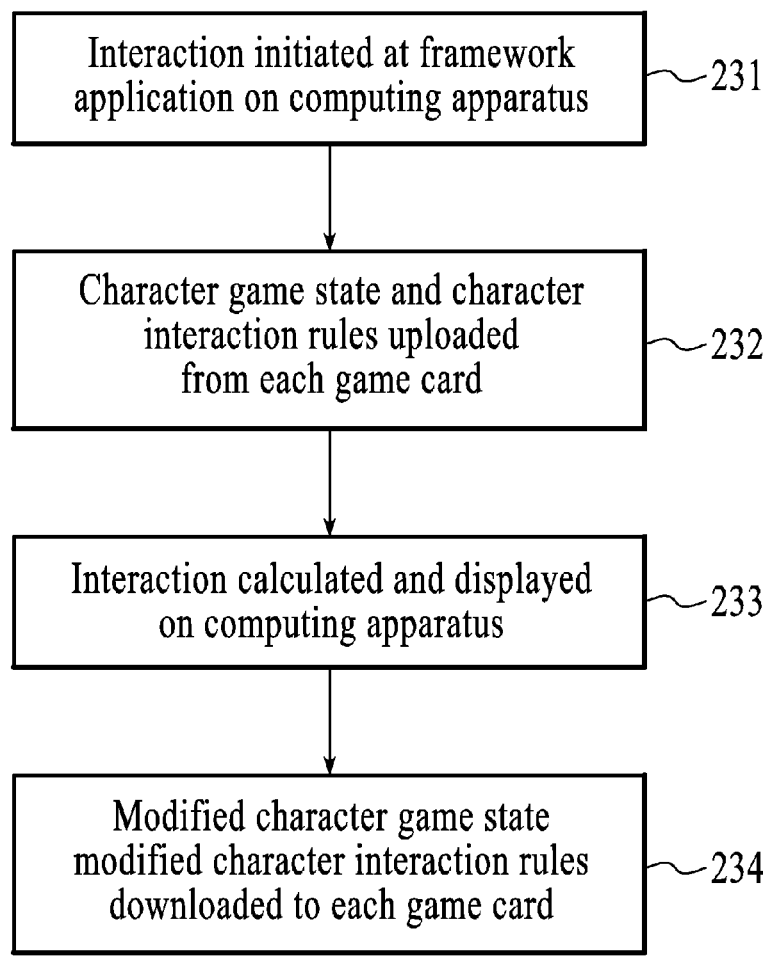
FIG. 23 shows a flow diagram for the interaction shown in FIG. 22.

FIG. 23 shows an interaction between the game cards of FIG. 22 according to this type of gaming approach. An interaction is initiated by starting the framework interaction application at the PDA (step 231). The memory tags of the interacting characters are then read (step 232) by the reader/writer, the PDA downloading not only state information relating to each game card but also interaction rules relating to each game card. An initiator for the interaction is determined—in this case, "Achilles of the North". The interaction then takes place, displayed on the PDA (step 233)—optionally this allows for user input (if, for example, the game is a game of skill—for example, a martial arts game between characters with different strengths and capabilities—in which case each user will probably use their own PDA) but may have no user input at all, except perhaps generation of a seed for a pseudorandom event as described earlier. This example is of the latter type—characters develop by virtue of their interactions with other characters, the nature of these interactions depending on various fixed character features (basic disposition and fundamental qualities) and features that change over time and history (number of interactions, number of interactions with character being interacted with etc.). Interaction rules for the characters may also change over time (for example, the character may refuse to interact with another character if certain conditions are not met—such as when they reach a certain level of experience, refusing to fight characters of clearly inferior strength—perhaps ignoring them, or training them, instead according to character compatibility). The interaction here results in an encounter—"Lord Katzenjammer" defeats "Achilles of the North" in combat, wounding him (but not fatally). Both cards are then updated (step 234) with changes in game state (health, experience) and changes in encounter rules: these will depend on existing characteristics of the characters as well as the encounter result, but for example, "Achilles of the North" may now be less likely to initiate combat (as opposed to another form of encounter)—in the extreme, he may retire from combat altogether—and markedly less likely to initiate combat with "Lord Katzenjammer", whereas "Lord Katzenjammer" may be inclined to force any combat initiated against him by "Achilles of the North" to a conclusion next time that it occurs.

The FIG. 23 arrangement does call for a minimal application to be present in the PDA to facilitate game card interaction. This can be dispensed with altogether—each game card could contain code which provides this framework structure, which is run when the first game card is read by the PDA. In a still further modification, the memory tags themselves may contain processors as well as memories. In this case, the PDA becomes simply a terminal allowing interchange of information between game cards and display of associated events to users. Such an arrangement can be brought into effect for appropriate embodiments described above.

The invention claimed is:
1. A game system, comprising:
 a. a plurality of electronic game pieces, each comprising a visual representation of a game character and a digital memory, the digital memory containing therein game state information
 b. a reader/writer apparatus having a power source, a computer and a memory, the memory for configuring the computer having therein a control program to power appropriately located ones of the game pieces, read information from at least a selected one of the game pieces to initiate electronically a game event involving the at least one selected game piece, determine a condi- tion and result of the game event, and write modified game state information data electronically to the at least one selected game piece;
wherein the digital memory of at least one electronic game piece further comprises executable programming code that when executed by the reader/writer apparatus provides, separate from the game event, an activity that is related to a particular game character visually represented by the at least one electronic game piece.

2. The game system of claim 1 wherein a game piece is in the form of a game card.

3. The game system of claim 1 wherein the activity is a game, puzzle or quiz.

4. The game system of claim 1 wherein the game piece is inductively powered by the reader/writer apparatus.

5. The game system of claim 1 wherein the representation of a game character is a three-dimensional representation and the game piece is a figurine.

6. A game system as claimed in claim 1, wherein the control program contains game rules and the game state information received from at least one selected game pieces relates to a game character or respective game characters of the selected game piece or pieces.

7. A game system as claimed in claim 6, wherein the control program contains only game rules to enable determination of game events and no variable game state information.

8. A game system as claimed in claim 6, wherein the control program contains both game rules and variable game state information.

9. A game system as claimed in claim 1, wherein the reader/writer apparatus is adapted to power game pieces inductively.

10. A game system as claimed in claim 1, wherein the reader/writer apparatus is adapted to read from and write to game pieces by radio frequency communication.

11. A game system as claimed in claim 1, wherein the reader/writer apparatus is adapted to power game pieces by bringing the game pieces into close proximity with the reader/writer apparatus.

12. A game system as claimed in claim 11, wherein game pieces are selected by bringing them into close proximity with the reader/writer apparatus.

13. A game system as claimed in claim 1, wherein the reader/writer is adapted to power game pieces in close proximity to a game board.

14. A game system as claimed in claim 13, wherein game pieces are selected by movement of one or more game pieces relative to the game board.

15. A method of making a gaming interaction using computing apparatus, comprising:
accessing electronically by the computing apparatus a respective memory in at least a first game piece and a second game piece;
uploading to the computing apparatus first game character state from a digital memory in the first game piece representing a first game character;
uploading to the computing apparatus a second game character state from a digital memory in the second game piece representing a second game character;
calculating, by the computing apparatus, a gaming interaction according to interaction rules; and downloading, by the computing apparatus, to at least one of the game piece digital memories modified game character state for the game character of that game piece;
accessing electronically by the computing apparatus executable programming code in the first game piece, the executable programming code, when executed, providing an activity that is related to the first game character.

16. A method of making a gaming interaction as claimed in claim 15, wherein the activity is a game, a puzzle or a quiz.

17. A method of making a gaming interaction as claimed in claim 15, wherein the interaction rules are uploaded to the computing apparatus from one or more of the game piece digital memories.

18. A method of making a game move on game apparatus comprising computing apparatus, game pieces with digital memories and a reader/writer apparatus adapted to sense the movement of game pieces, comprising:
sensing the movement of a game piece with the reader/writer apparatus;
uploading game character state relating to the moved game piece to the computing apparatus;
identifying a destination of the game piece;
determining changes in game state and game character state resulting from the movement of the game piece; and
downloading modified game character state relating to the moved game piece to the computing apparatus;
downloading from the game piece to the computing apparatus executable programming code which when executed on the computing apparatus provides an activity relating to the game piece.

19. A method of gaming, comprising running a software application on a suitable computing apparatus and uploading data relating to one or more game characters from digital memories associated with representations of the said one or more game characters, wherein data from a digital memory associated with a first game character comprises executable programming code, wherein a condition and result of the gaming is in accordance to a calculated probability based at least in part on the uploaded data relating to one or more of the game characters and a generated pseudorandom number, and wherein the executable programming code, when executed, provides an activity that is related to the first game character.

20. A method of gaming as claimed in claim 19, wherein the data from digital memories also comprises attributes of the game characters.

21. A method of gaming as claimed in claim 19, wherein each said digital memory is located on a game card with a visual representation of the associated character.

22. A method of gaming as claimed in claim 21, wherein activity is a game, a puzzle or a quiz.

23. A method of gaming as claimed in claim 19, further comprising the step of modifying the data in one or more of the digital memories after a gaming interaction.

24. A method of gaming as claimed in claim 23 wherein the data comprises a visual representation of the associated character and comprising modifying a visual representation of the associated character held in a digital memory.

25. A method of printing a card containing a visual representation of a character and a digital memory containing digital content relating to the character represented visually on the card from an existing such card, the method comprising:
uploading the digital content from the existing such card to a computing apparatus associated with a printer;
extracting image data from the digital content and using the image data to print the visual representation of the character on the new card; and
copying the digital content to the digital memory of the new card;

swapping the digital content of the new card with second digital content on a third card, the second digital content related to the character, but not identical to the digital content.

26. A method of printing a card as claimed in claim 25, wherein the digital content comprises image data for the visual representation of the character represented visually on the existing card.

27. A method of printing a card as claimed in claim 25, wherein the digital content comprises image data for a visual representation of the character represented visually on the existing card different from the visual representation of the character represented visually on the existing card.

\* \* \* \* \*